July 5, 1927. 1,635,106
C. T. BARKER
MEANS FOR HEADING AND LOADING KAFIR CORN, MAIZE, AND THE LIKE
Filed Aug. 28, 1924 2 Sheets-Sheet 1
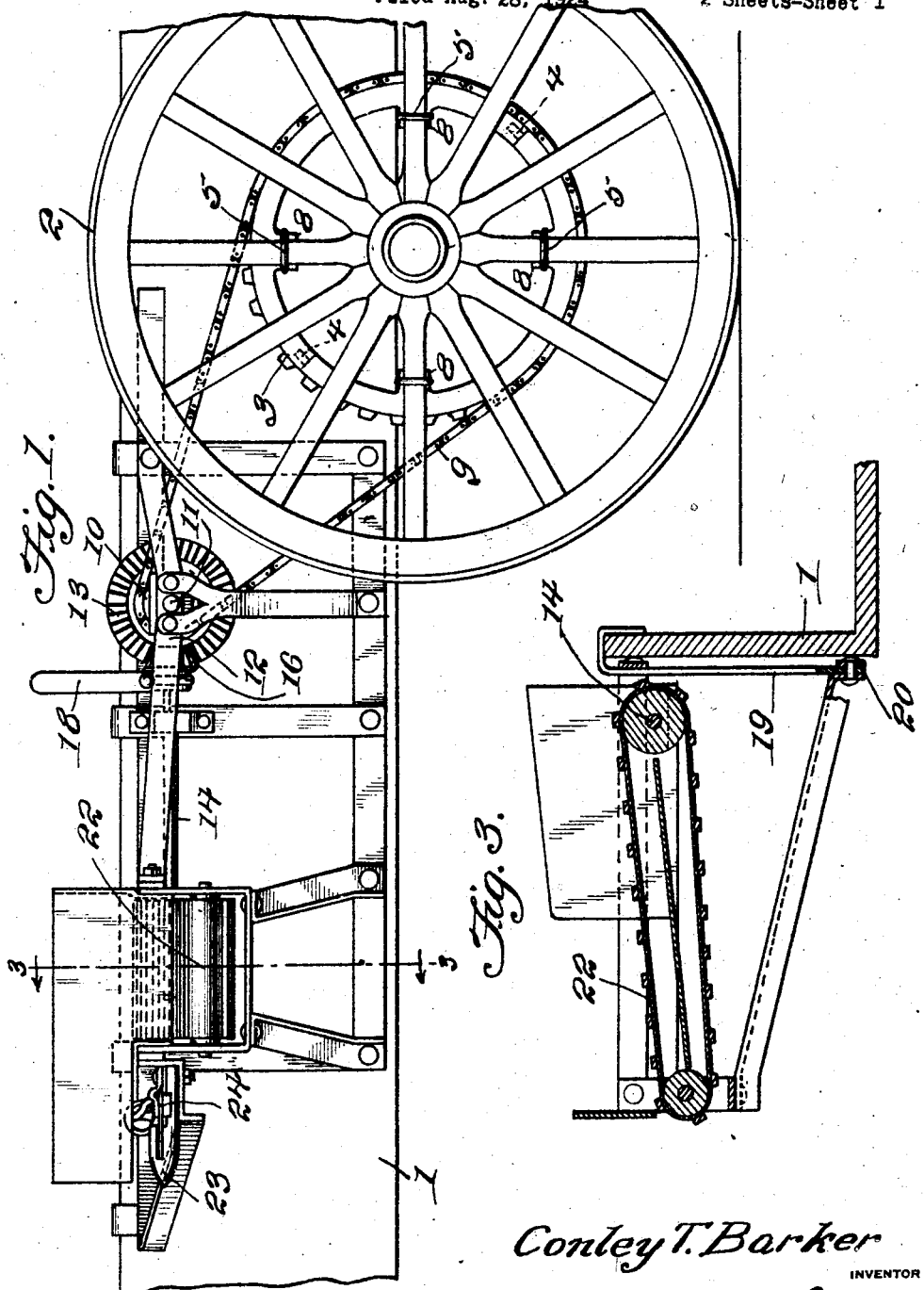
Conley T. Barker
INVENTOR
BY Victor J. Evans
ATTORNEY
WITNESS: J. L. Wright July 5, 1927.
C. T. BARKER
1,635,106
MEANS FOR HEADING AND LOADING KAFIR CORN, MAIZE, AND THE LIKE
Filed Aug. 28, 1924    2 Sheets-Sheet 2
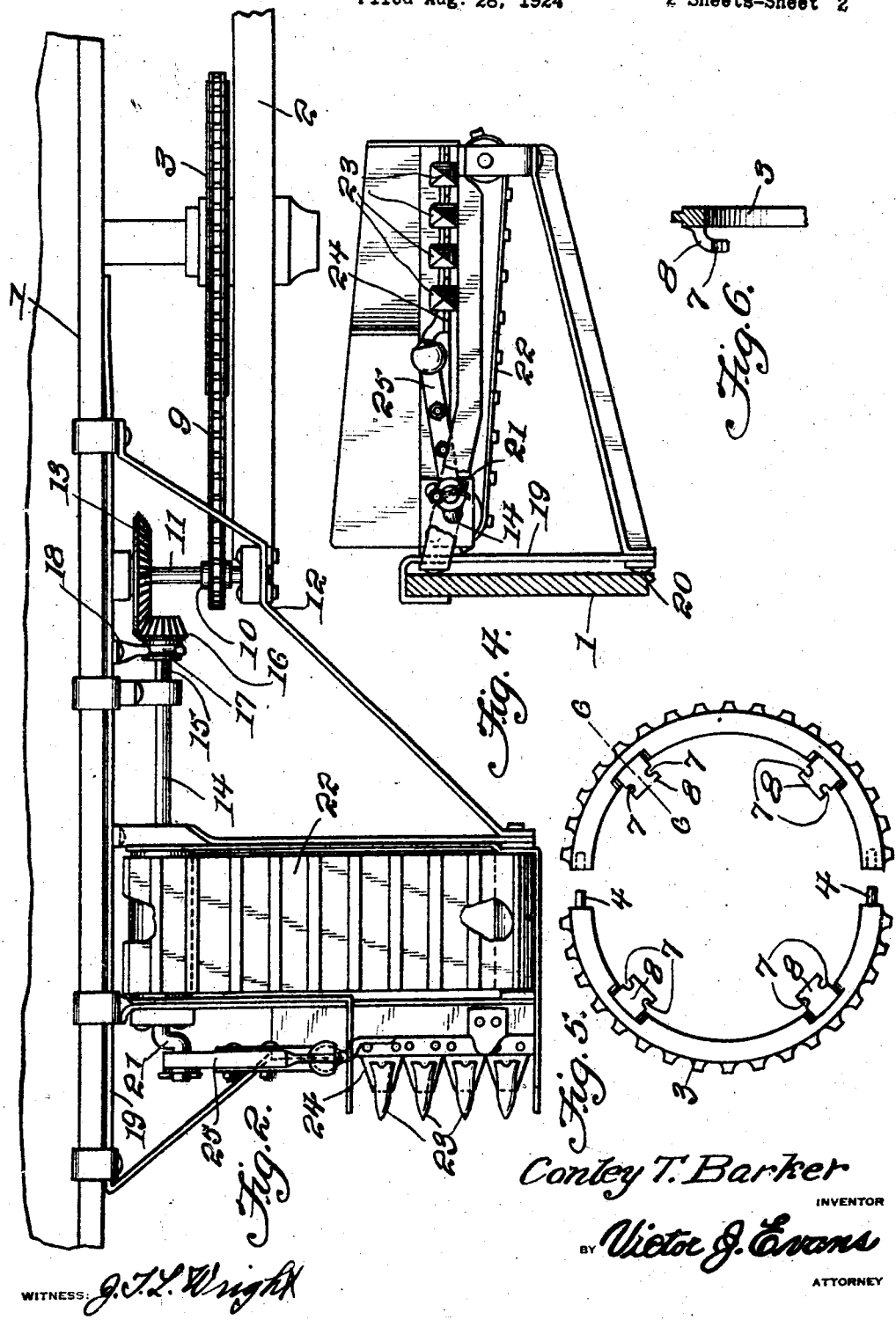
Conley T. Barker
INVENTOR
BY Victor J. Evans
ATTORNEY
WITNESS: J.T.L. Wright Patented July 5, 1927.

1,635,106

UNITED STATES PATENT OFFICE.

CONLEY T. BARKER, OF GATE CITY, VIRGINIA.

MEANS FOR HEADING AND LOADING KAFIR CORN, MAIZE, AND THE LIKE.

Application filed August 28, 1924. Serial No. 734,807.

The object of my said invention is the provision of simple and efficient means adapted to be carried by a wagon and to head rows of Kafir corn and similar grains and load the detached heads into a wagon incident to the movement of the wagon along the row.

To the attainment of the foregoing, the invention consists in the improvement as hereinafter described and definitely claimed.

In the accompanying drawings, forming part of this specification:—

Figure 1 is a view in side elevation illustrating the preferred embodiment of my invention as applied to a wagon.

Figure 2 is a plan view of the same.

Figure 3 is a cross section taken in the plane indicated by the line 3—3 of Figure 1.

Figure 4 is a cross section taken in a plane front of the cutting apparatus of the improvement.

Figures 5 and 6 are detail views of the sprocket gear that is attached to one of the wagon wheels, Figure 6 being taken in the line 6—6 of Figure 5.

Similar numerals of reference designate corresponding parts in all of the views of the drawings.

The body of the wagon is designated by 1 and one of the rear wheels is designated by 2.

Among other elements my improvement comprises a sprocket gear 3. The sprocket gear 3 is made in two sections as shown in Figure 5 to facilitate its application to the wheel 2, and when the said sections are assembled and are joined by pins 4 the sections in the joined state are connected to the spokes of the wheel by shackles 5, the said shackles straddling the wheel spokes and being seated in notches 7 formed in offset lugs 8 on the sections of the gear 3 as illustrated.

In addition to the gear 3 the improvement comprises a sprocket belt 9 and a forward sprocket gear 10, the belt 9 connecting the gears 3 and 10, and the said gear 10 being fixed to a shaft 11 mounted between the side of the body 1 and a spur 12 spaced outwardly from said body side and being equipped at 13 with a miter gear in parallelism with the body side as appears in Figure 2. Arranged alongside the body side and journaled in appropriate bearings is a shaft 14 the rear portion 15 of which is of angular cross-section for the keying of the rotary and longitudinally movable miter gear 16, said gear 16 having a circumferentially grooved portion 17 for the engagement of a hand lever 18 through the medium of which the gear may be moved into and out of mesh with the gear 13. Manifestly by manipulation of the said lever 18 the driving connection between the wagon wheel 2 and the longitudinal shaft 14 may be quickly and easily established and interrupted as occasion demands.

Hung on the side wall of the body 1 as shown in Figures 2 and 3 is a frame 19 that extends laterally from the body 1 and bears at 20 against the same. The said frame receives the forward portion of the longitudinal shaft 14 on which is a crank 21, and it carries a transversely movable conveyor 22 connected to be driven by said shaft 14.

At its forward portion the frame 19 carries a cutting apparatus made up of spaced fingers 23 and a reciprocatory cutter bar 24, the said cutter bar 24 being connected by a pitman 25 with the before mentioned crank 21 on the shaft 14.

In the practical operation of my improvement it will be understood that when the gears 13 and 16 are in mesh and the wagon is moved along a row of grain, the apparatus constructed and relatively arranged as shown and described will head the grain and load the heads on the wagon.

After the operation of the apparatus and the obtaining of a load on the wagon, the driving connection described is interrupted and the wagon is driven to a barn and unloaded after which the wagon is returned to the field and again operated in the manner and for the purpose described.

It will be apparent that my novel apparatus is simple and inexpensive in construction, is susceptible of ready application to a wagon such as at present in use and is capable of being used to advantage in the gathering of a considerable crop in a short space of time.

I have specifically described the preferred embodiment of my invention in order to impart an exact understanding of said embodiment. I do not desire, however, to be understood as confining myself to the said specific construction inasmuch as the scope of my invention is defined by my appended claim within which changes may be made without departure from my invention.

Having described my invention, what I claim and desire to secure by Letters-Patent, is:—

In a row header, the combination of a wheeled body having a side wheel, a frame detachably hung on and bearing against said side wall of the body and having a portion projecting laterally from said side wall, a spur included in said portion and arranged adjacent said wheel, a transverse shaft mounted between and carried by the spur and said frame, a driving connection between one of the wheels of the body and said transverse shaft, a miter gear on said shaft, a longitudinal shaft carried by said frame and having a forward crank portion, a miter gear keyed on the rear portion of the longitudinal shaft and adapted to be meshed with the first-named miter gear, a lever for moving the second-named gear into and out of engagement with the miter gear, an endless conveyor carried by the laterally projecting portion of said frame and arranged to be driven by said longitudinal shaft, and cutting mechanism carried in front of the outer portion of said laterally projecting portion and having a reciprocatory cutter bar connected with the said crank portion of the longitudinal shaft.

In testimony whereof I affix my signature.

CONLEY T. BARKER.